(12) United States Patent
Edwards et al.

(10) Patent No.: US 7,296,042 B2
(45) Date of Patent: *Nov. 13, 2007

(54) SYSTEM AND METHOD FOR ENABLING COMMUNICATION AMONG ARBITRARY COMPONENTS

(75) Inventors: Warren Keith Edwards, San Francisco, CA (US); Mark Webster Newman, San Francisco, CA (US); Jana Zdislava Sedivy, Stanford, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 491 days.

This patent is subject to a terminal disclaimer.

(21) Appl. No.: 09/838,933

(22) Filed: Apr. 20, 2001

(65) Prior Publication Data

US 2002/0156795 A1    Oct. 24, 2002

(51) Int. Cl.
*G06F 17/30* (2006.01)
(52) U.S. Cl. .................. 707/205; 709/227; 707/9
(58) Field of Classification Search ............. 707/102, 707/10, 104.1, 205, 225, 9; 715/505; 709/217, 709/201, 227, 220; 719/328, 315
See application file for complete search history.

(56) References Cited

U.S. PATENT DOCUMENTS

| | | | | |
|---|---|---|---|---|
| 5,694,546 | A * | 12/1997 | Reisman | 707/10 |
| 6,003,065 | A * | 12/1999 | Yan et al. | 709/201 |
| 6,125,388 | A * | 9/2000 | Reisman | 707/104.1 |
| 6,430,395 | B2 * | 8/2002 | Arazi et al. | 370/347 |
| 6,557,054 | B2 * | 4/2003 | Reisman | 709/219 |
| 6,628,413 | B1 * | 9/2003 | Lee | 358/1.15 |
| 6,658,464 | B2 * | 12/2003 | Reisman | 719/315 |
| 6,696,973 | B1 * | 2/2004 | Ritter et al. | 709/250 |
| 6,910,068 | B2 * | 6/2005 | Zintel et al. | 709/220 |
| 7,130,895 | B2 * | 10/2006 | Zintel et al. | 709/220 |
| 2002/0029256 | A1 * | 3/2002 | Zintel et al. | 709/218 |
| 2002/0124055 | A1 * | 9/2002 | Reisman | 709/218 |

FOREIGN PATENT DOCUMENTS

WO    WO 99/44124    9/1999

OTHER PUBLICATIONS

Jim Waldo, "the JINI Architecture for Network-Centric Computing", Jul. 1999, Commnications of the ACM.*

(Continued)

*Primary Examiner*—Kim Vu
*Assistant Examiner*—Tom Gyorfi
(74) *Attorney, Agent, or Firm*—Park, Vaughan & Fleming LLP

(57) ABSTRACT

Methods and systems for enabling arbitrary components to communicate with each other. The communication system includes a first set of components associated with one or more universal interfaces that include mobile code. The one or more universal interfaces comprise a data source interface, a data sink interface, an aggregation interface, a mutable aggregation interface, a context interface, a notification interface or a user interface. Further, the universal interfaces associated with the first set of components can be provided to and implemented by a second set of components to enable the second set of components to communicate with the first set of components despite the first set and the second set of component utilizing different communication mediums or protocols.

33 Claims, 6 Drawing Sheets

OTHER PUBLICATIONS

E. Saund, "Bringing the Marks on a Whiteboard to Electronic Life", Cooperative Buildings: Integrating Information Organization, and Architecture, Second International Workshops, Xerox Palo Alto Research Center (1999).*

"UPnP Device Architecture Version 1.0" © 1999-2000 Contributing Members of the UPnP Forum.*

Y. Goland, T. Cai, P. Leach, Yu Ge, S. Albright, "Simple Service Directory Protocol/1.0: Operating Without an Arbiter" Published Oct. 28, 1999. http://quimby.gnus.org/internet-drafts/draft-cai-ssdp-v1-03.txt.*

Definition of "Protocol" http://dictionary.reference.com/browse/protocol.*

"Java Chips: The Hardware Solution" © 1998 Byte.com http://www.byte.com/art/9805/sec5/art2.htm.*

"SUN plans new Java Processor" © 1999 Hoise-NM Consortium http://www.hoise.com/primeur/99/articles/monthly/AE-PR-09-99-51.html.*

Jini™ Architectural Overview Technical White Paper Palo Alto, California:Sun Microsystems, Inc., pp. 1-23 (1999).

Jini™ Technology Glossary, Palo Alto, California:Sun Microsystems, Inc., pp. 479-499 (2000).

Jini™ Device Architecture Specification, Palo Alto, California:Sun Microsystems, Inc., pp. 1-14 (2000).

JavaSpaces™ Service Specification, Palo Alto, California:Sun Microsystems, Inc., pp. 1-24 (2000).

Jini™ Technology Core Platform Specification, Palo Alto, California:Sun Microsystems, Inc., pp. 1-126 (2000).

A Collection of Jini™ Technology Helper Utilities and Services Specifications, Palo Alto, California:Sun Microsystems Inc., pp. 1-214 (2000).

Universal Description, Discovery and Integration Data Structure Reference V1.0, Ariba, Inc., International Business Machines Corporation and Microsoft Corporation, pp. 1-31 (2000).

Universal Description, Discovery and Integration Programmer's API 1.0, Ariba, Inc., International Business Machines Corporation and Microsoft Corporation, pp. 1-67 (2000).

Universal Description, Discovery and Integration Technical White Paper, Ariba, Inc., Internatioanl Business Machines Corporation and Microsoft Corporation, pp. 1-12 (2000).

Mapping Salutation Architecture APIs to Bluetooth Service Discovery Layer, Version 1, IBM Corp., pp. 1-26 (1999).

Bluetooth Protocol Architecture, Version 1, Nokia Mobile Phones, pp. 1-20 (1999).

Bluetooth Consortium 2001, Specification of the Bluetooth System, Version 1.1 core, Table of Contents and Index (2001) [Retrieved from the Internet at http://www.bluetooth.com on Sep. 27, 2001].

Bluetooth Consortium 2001, Specification of the Bluetooth System, Version 1.1 core, Part C, pp. 184-252 (2001) [Retrieved from the Internet at http://www.bluetooth.com on Sep. 27, 2001].

Bluetooth Consortium 2001, Specification of the Bluetooth System, Version 1.1 core, Part D, pp. 255-330 (2001) [Retrieved from the Internet at http://www.bluetooth.com on Sep. 27, 2001].

Bluetooth Consortium 2001, Specification of the Bluetooth System, Version 1.1 core, Part E, pp. 332-392 (2001) [Retrieved from the Internet at http://www.bluetooth.com on Sep. 27, 2001].

Bluetooth Consortium 2001, Specification of the Bluetooth System, Version 1.1 core, Part F:1, pp. 394-424 (2001) [Retrieved from the Internet at http://www.bluetooth.com on Sep. 27, 2001].

Bluetooth Consortium 2001, Specification of the Bluetooth System, Version 1.1 core, Part F:4, pp. 512-534 (2001) [Retrieved from the Internet at http://www.bluetooth.com on Sep. 27, 2001].

Bluetooth Consortium 2001, Specification of the Bluetooth System, Version 1.1 core, PartH:2, pp. 782-796 (2001) [Retrieved from the Internet at http://www.bluetooth.com on Sep. 27, 2001].

Bluetooth Consortium 2001, Specification of the Bluetooth System, Version 1.1 core, Appendix III, pp. 914-922 (2001) [Retrieved from the Internet at http://www.bluetooth.com on Sep. 27, 2001].

N. Borenstein et al., "MIME (Multipurpose Internet Mail Extensions): Mechanisms for Specifying and Describing the Format of Internet Messages," pp. 1-77 (1992) [Retrieved from the Internet at http://www.oac.uci.edu/indiv/ehood/MIME/1521/.rfc1521TOC.html on Sep. 14, 2001].

E. Christensen et al., Web Services Description Language (WSDL) 1.1, (Jan. 23, 2001) [Retrieved from the Internet at http://msdn.microsoft.com/xml/general/wsdl.asp on Sep. 27, 2001].

N. Cutland, Computability, Cambrdige Unviersity Press, pp. 7-42 (1980).

A. Dey et al., "A Conceptual Framework and a Toolkit for Supporting the Rapid Prototyping of Context-Aware Applications," Human Computer Interaction Journal, 16:1-67 (2001).

P. Dourish et al., "Extending Document Management Systems with User-Specific Active Properties," ACM Transactions on Information Systems, Xerox Palo Alto Research Center, pp. 1-27 (2000).

N. Economides, "The Economics of Networks," International Journal of Industrial Organization, 14:2, pp. 1-36 (1996).

W. K. Edwards, "Session Management for collaborative Applications," Proceedings of ACM Conference on Computer-Supported Cooperative Work (CSCW '94), Georgia Institute of Technology, Chapel Hill, NC, (1994).

A. Fox et al., "Integrating Information Appliances into an Interactive Space," IEEE Computer Graphics and Applications, Stanford University, 20:3, pp. 54-65 (2000).

E. Gamma et al., Design Patterns: Elements of Reusable Object-Oriented Software, Addison-Wesley, pp. 1-31 (1995).

Y. Goland et al., Simple Service Discovery Protocol/1.0: Operating Without an Arbiter, Internet Engineering Task Force Internet Draft (1999) [Retrieved from the Internet at http://www.upnp.org/draft_cai_sssdp_vl_03.txt on Sep. 14, 2001].

C. Gray et al., "Leases: An Efficient Fault-Tolerant Mechanism for Distributed File Cache Consistency," Proceedings of the 12th ACM Symposium on Operating Systems Principles (SOSP), Association of Computing Machines, pp. 202-210 (1989).

User Interface Modelling Language 2.0 Draft Specification, Harmonia, Inc., pp. 1-64, (2000) [Retrieved from the Internet at http://www.uiml.org/specs/uim12/index.htm on Sep. 14, 2001].

T. Hodes et al., "A Document-Based Framework for Internet Application Control," Proceedings of the Second USENIX Symposium on Internet Technologies and Systems (USITS), USENIX Association, Boulder, CO, pp. 59-70 (1999).

D. Iseminger, COM+ Developer's Reference, Microsoft Press, pp. 1-6 (2000).

E. Kiciman et al., "Using Dynamic Mediation to Integrate COTS Entities in a Ubiquitous Computing Environment," Proceedings of the Second International Symposium on Handheld and Ubiquitous Computing (HUC), Stanford University (2000).

G. Kiczales et al., The Art of the Metaobject Protocol, MIT Press, pp. 12-46 (1991).

T. Kindberg et al., "A Web-Based Nomadic Computing System," HP Labs Technical Report HPL-2000-110, pp. 1-13 (2000) [Retrieved from the Internet at http://cooltown.hp.com/papers/nomadic/nomadic.htm on Sep. 14, 2001].

[Author Unknown] "Plug and Play Specifications," Microsoft Corp., (1999) [Retrieved from the Internet at http://www.microsoft.com/HWDEV/respec/pnpspecs.htm on Sep. 14, 2001].

[Author Unknown] "Universal Plug and Play," Microsoft Corp. (2000) [Retrieved from the Internet at http://msdn.microsoft.com/library/psdk/upnp/upnpport_6zz9 on Sep. 27, 2001].

[Author Unknown] "C# Language Specification," Microsoft Corp., Microsoft Press, pp. 1-41 (2001).

W. Newman et al., "Cam-Works: A Video-based Tool for Efficient Capture from Paper Source Documents," Proceedings of the International Conference on Multimedia Computing and Systems, Florence, Italy, vol. 2, pp. 647-653 (1999).

J. Ockerbloom, Mediating Among Diverse Data Formats, PhD. thesis, Carnegie Mellon University, pp. 1-150 (1999).

[Author Unknown] "White Paper: Salutation Architecture: Overview," Salutation Consortium (1998) [Retrieved from the Internet at http://www.salutation.org/whitepaper/originalwp.pdf on Sep. 27, 2001].

[Author Unknown] "JavaBeans Specification," Sun Microsystems, pp. 1-114 (1997) [Retrieved from the Internet at http://ja-va.sun.com/products/javabeans/docs/beans.101.pdf on Sep. 14, 2001].

[Author Unknown]. "Jini Discovery and Join Specification," Sun Microsystems, pp. 1-32 (1999).

[Author Unknown] "UDDI Technical Whitepaper," Universal Description, Discovery, and Integration Consortium, pp. 1-12 (2000) [Retrieved from the Internet at http://www.uddi.org/pubs/Iru_UDDI_Technical_White_Paper.PDF on Sep. 14, 2001].

B. Venners, *Jini Service UI Draft Specification*. (2000) [Retrieved from the Internet at http://www.artima.com/jini/servi-ceui/DraftSpec.html on Sep. 27, 2001].

J. Waldo, "The Jini Architecture for Network-centric Computing," *Communications of the ACM*, 42:7, pp. 76-82 (1999).

M. Weiser et al., "Designing Calm Technology" (1995) [Retrieved from the Internet at http://www.fxpal.com/ConferencesWorkshops/chi97/white-papers/Mark%2520Weiser.html on Oct. 10, 2001].

A. Wollrath et al., "A Distributed Object Model for the Java System," *USENIX Computing Systems*, vol. 9 (1996).

U.S. Appl. No. 09/838,933, filed Apr. 20, 2001, Newman et al.

U.S. Appl. No. 10/058,268, filed Jan. 29, 2002, Newman et al.

U.S. Appl. No. 10/052,585, filed Jan. 23, 2002, Newman et al.

[Author Unknown] "Service Discovery Protocol (SDP)," Bluetooth Specification Version 1.0 B, Part E, pp. 324-384 (1999) [Retrieved from the Internet at http://www.panatec.de/html/Bluetooth/bluetooth_e.pdf on May 4, 2004].

McManis, C., "Take an In-Depth Look at the Java Reflection API," pp. 1-7 (1997) [Retrieved from the Internet at http://www.javaworld.com/javaworld/jw-09-1997/jw-09-indepth_p.html on May 4, 2004].

Cable, L., "Extensible runtime Containment and Service Protocol For JavaBeans Version 1.0," pp. 1-23 (1998) [Retrieved from the Internet at http://www.java.sun.com/products/javabeans/glasgow/beancontext.pdf on May 4, 2004].

\* cited by examiner

SYSTEM AND METHOD FOR ENABLING COMMUNICATION AMONG ARBITRARY COMPONENTS

FIELD OF THE INVENTION

This invention relates generally to communication methods and systems and, more particularly, to a method and system for enabling arbitrary components to communicate with each other using one or more universal interfaces employing mobile code.

BACKGROUND OF THE INVENTION

In data communication environments, such as a distributed network, many different vendors provide products for their specific services. Heretofore, a predetermined set of protocols has been required to be specified to enable arbitrary components in the environment to communicate with each other, assuming the components were transmitting or receiving data, hereinafter referred to as ("transferring data"). For example, a device manufactured by one vendor would have difficulty communicating with a device manufactured by another vendor without using the predetermined set of protocols mentioned above. The problem of different vendors requiring different predetermined protocols has been partially dealt with by adopting existing protocol standards. However, there are different standards organizations and thus different protocol standards.

When arbitrary components such as computer applications or programs, data, memory, file directories, individual files, printer devices, cellular telephones, facsimile machines, copier machines, scanner devices, desk-top computers, lap-top computers, PDA systems, or any other device, for example, attempt to communicate without having prior knowledge of each other, particular domain-specific protocols, such as the file system domain (e.g., NFS and CIFS) or the printer domain (e.g., IPP and LPR) must be known by both parties to successfully communicate. An arbitrary component, such as an application attempting to communicate with a file system or a printer device, must be explicitly programmed to understand one or more of the standardized protocols mentioned above. However, if new components enter the equation, the application must be reprogrammed to understand the new standardized protocols used to communicate with the new components. Thus, each application must be explicitly written to use a particular set of standardized protocols a priori to communicating with the components associated with the protocols.

For example, in a system such as Jini™, developed by Sun Microsystems of Palo Alto, Calif., which is hereby incorporated by reference in its entirety, in order for a component such as an application to communicate with another component such as a printer, the application must contain a priori knowledge of the semantics of the printer's programmatic interfaces. In other words, an application that knows how to print still would not know how to communicate with a file system, scanner or a network translation service until it was explicitly programmed to know how to communicate with the interface for the particular components.

The problems noted above are exacerbated when components utilize different data transfer mediums. For instance, a person using a cellular telephone might want to communicate with a printer device to print out a list of contact phone numbers. Since the cellular telephone may only be able to communicate using its wireless data transfer medium and associated protocols while the printer device may only be able to communicate using a line-based data transfer medium and associated protocols, there would be no way for the devices to communicate directly without involving a third party and one of the devices having a priori knowledge of each other as discussed above.

SUMMARY OF THE INVENTION

A system for enabling one or more arbitrary components using one or more communications protocols and transfer mediums to communicate with each other in accordance with the present invention includes a first component associated with one or more universal interfaces, a second component obtaining one of the one or more universal interfaces associated with the first component and invoking the at least one of the universal interfaces to communicate with the first component.

The system in accordance with the present invention provides a number of advantages, including allowing components using the same or different communications mediums and/or protocols to communicate without having a priori knowledge of each other.

A method, a computer data signal embodied in a carrier wave, and a program storage device readable by a machine and tangibly embodying a program of instructions executable by the machine for enabling one or more arbitrary components using one or more communications protocols and transfer mediums to communicate with each other in accordance with the present invention include obtaining universal interfaces associated with a first component and invoking at least one of the universal interfaces to communicate with the first component.

The present invention allows components using the same or different communications mediums and/or protocols to communicate without having a priori knowledge of each other.

DETAILED DESCRIPTION OF THE INVENTION

Figure 1:
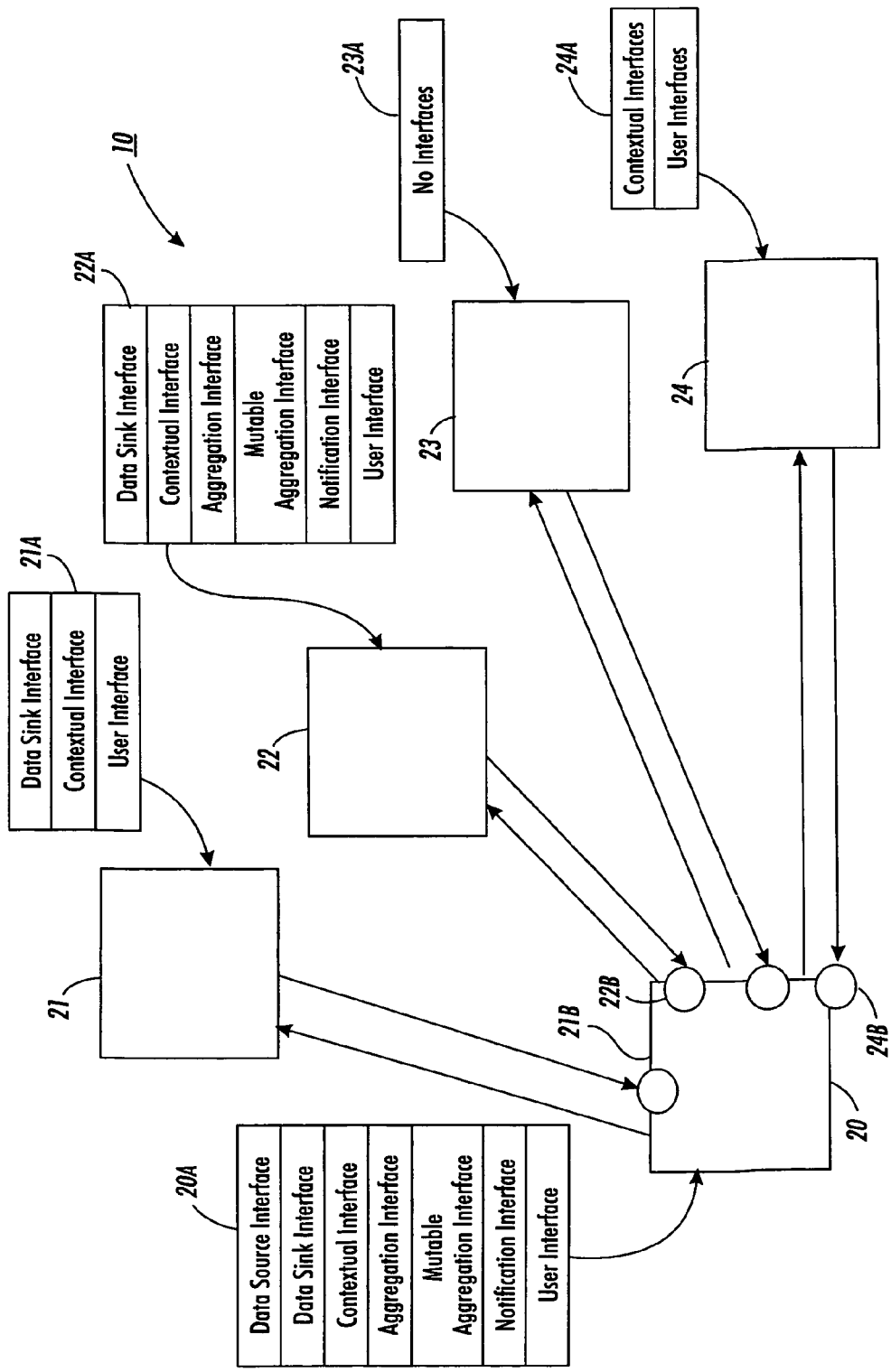
FIG. 1 is a block diagram of a system for enabling arbitrary components to communicate with each other in accordance with one embodiment.

A system 10 for enabling arbitrary components 20-24 to communicate with each other in accordance with one embodiment of the present invention is shown in FIG. 1. In this embodiment, system 10 includes components 20-24, data objects 21b-24b, and universal interfaces 20a-24a. A method in accordance with one embodiment includes obtaining one of the universal interfaces 20a-24a included within one of the data objects 21b-24b and invoking the obtained universal interface to communicate with the component associated with that universal interface. The present invention allows components 20-24 using the same or different transfer mediums and/or communication protocols to communicate without having a priori knowledge of each other.

Referring more specifically to FIG. 1, component 20 is operatively coupled to each of the components 21-24 in this particular embodiment, although other coupling arrangements or configurations can be used as well as greater or lesser numbers of components. For example, one or more of the components 21-24 could be directly coupled to one or more of the other components 21-24 (i.e., peer-to-peer) and system 10 could comprise components 20 and 21.

In this embodiment, components 20-24 are operatively coupled together over a line based transfer medium, such as public switched telephone lines and/or coaxial cable connections. Although a line based transferred medium is used in this embodiment, other types of transfer mediums, such as wireless based transfer mediums, could also be used between two or more of the components 20-24.

In this embodiment, a conventional dial-up communication system through private branch exchanges ("PBX") and using line based telephone communication protocols is used by components 20-24 to communicate. Although one type of line based communication system and protocol is shown, a variety of different types of communication systems and/or protocols may be used. For example, communication systems or network architectures, such as local area networks ("LAN"), wide area networks ("WAN") and cellular or satellite communications network systems that utilize signals, such as satellite signals, radio waves, microwaves and/or infrared signals, can be used. Additionally, a variety of communication protocols for transferring data, such as xDSL ISDN and TCP/IP, protocols defined by the RFC or OSI organizations can also be used. The type of protocol used will depend upon the type of data transfer medium utilized by a particular component, the type of component (e.g., a printer device or a scanner device) and/or the type of network environment the component is operating in (e.g., a file directory in a UNIX operating environment). Components that utilize the same type of data transfer medium may use one or more communications protocols as well, often dependent upon the particular type of component. The arrows in FIG. 1 depict the flow of communications between component 20 and components 21-24.

An existing component is defined herein as a component that is already enabled to communicate with other components and a new component is defined as a component that is not yet enabled to communicate with the other components. In this embodiment, each of the components 20-24 comprises a computer system, such as a PDA unit or palm-top computer, a laptop computer, a desktop computer, or a computer server, that can store, process and execute programmed instructions for performing one or more methods of the present invention as described herein and illustrated in the figures, although components 10 may comprise any type of device or system that can store, process and execute instructions for performing one or more methods of the present invention. By way of example only, components 20-24 may also comprise printers, scanners, cellular telephones, display devices, video input/output devices, audio input/output devices, remote control devices or appliances. One or more of the components 20-24 may also comprise any type of device with circuitry that is hard-wired to execute instructions for performing one or more methods of the present invention.

In this embodiment, each of the computer systems for each of the components 20-24 includes a central processing unit ("CPU") and memory which are coupled together by a bus. The memory may comprise any type of storage devices accessible by the CPU, such as RAM, ROM, hard-disks, floppy-disks, CD-ROMs, DVD-ROMs, or any other type of computer-readable mediums. The instructions for the method in accordance with the present invention are programmed and stored in the memory so they can be retrieved and executed by the CPU. The instructions may be expressed as executable programs written in a number of computer programming languages, such as BASIC, Pascal, C, C++, C#, Java, Perl, COBOL, FORTRAN, assembly language, machine code language, or any methodology that can be understood and performed by the CPU. Although in this embodiment, the CPU and memory are in the same physical location, the CPU and memory may be located at different physical locations. In addition, the same manner for effecting the operable coupling of the components to each other as described herein may be utilized to couple the processor and memory.

In this embodiment, programmed instructions for performing one or more of the methods of the present invention for components 20-24 are part of one or more other applications with programmed instructions for performing other tasks stored in components 21-24, such as word processing applications, spreadsheet applications, accounting applications or engineering applications which are executed by the CPU, although these instructions for performing one or more methods of the present invention can be elsewhere. As a result, when one of these applications is executed, the instructions for the task, such as for creating a spreadsheet, as well the instructions for performing one or more of the methods of the present invention, such as performing methodologies to discover other components, to introspect data objects received from discovered components, and then to utilize one or more universal interfaces included within the received data objects to communicate with the other components, are carried out by one or more of the CPUs in components 20-24.

In this embodiment, components 20-24 also have one or more applications having executable programmed instructions for performing other types of tasks that do not include executable programmed instructions for performing one or more of the methods of the present invention, although other embodiments may not have such applications. As a result, for a component to communicate with one of these applications being executed in another component, a set of instructions for performing one or more of the methods of the present invention separate from these applications must be executed. In this particular example, this is accomplished by executing instructions for an operating system environment the component is operating in, such as the UNIX® environment, as described in "Advanced Programming in the UNIX® Environment," W. Richard Stevens, Addison-Wesley Publishing Company, 1974, which is hereby incorporated by reference in its entirety. The instructions for the operating system also include instructions for performing one or more of the methods of the present invention. The component with the operating system environment performs the instructions for communicating with other components in accordance with one or more embodiments of the present invention and also interacts with the other application.

Components 20-24 may also store programmed instructions for execution by one or more of the CPUs for a network service, such as data, memory, file directories, individual files, or sets of instrucions that can be merged with other sets of instructions in the same or other components to create an application or perform paticular tasks. As described above, these instructions may or may not include instructions for performing open or more methods of the present invention.

Components 20-24 may also include computer executable programmed instructions for accessing, controlling and/or operating one or more other components. In this example, a component enables one or more other components that can communicate using one type of communication medium (e.g., wireless network) to communicate with another component that can communicate using a different type of communication medium (e.g., line-based network). For example, component 21 may be a PDA device that would like to communicate with component 22, which might be a printer device, to print out a file stored therein. However, in this example component 21 may only transfer data through a wireless infrared connection while component 22 may only transfer data through a parallel cable line. As a result, component 20 may control component 21 and component 22 to allow the two components to communicate with each other and thus transfer data between each other using one or more methods of the present invention as described further herein below. Again, as described above these instructions for accessing, controlling, and/or operating may or may not include instructions for performing one or more methods of the present invention.

Components 20-24 also include computer executable programmed instructions relating to the communication protocol used by a particular component 21-24. Each of the components 20-24 may not use the same communication protocols as any of the other components 20-24. By way of example only, component 20 may comprise a printer device operating in a UNIX® environment using a line-based communications medium and a first type of communication protocol to communicate, while component 21 may comprise a scanner device operating in a Microsoft Windows® environment that also communicates using a line-based communications medium, but uses a second type of communication protocol. As explained herein, one or more methods of the present invention can be used to enable component 20 and component 21 to communicate with each other directly or using the browser components described above despite their use of different communication protocols.

Data objects 21b-24b are stored in component 20 in this embodiment, although the data objects 21b-24b could be stored elsewhere. Each of the data objects 21b-24b are included within the sets of universal interfaces 20a-24a. More specifically, each of data objects 21b-24b support the various operations defined by the interfaces associated with components 21-24, which are assumed to be known by component 20. The data objects 21b-24b each comprise instructions (i.e., computer executable code) and/or data that provide particular implementations of the one or more interfaces associated with each of the components 20-24 from which the data objects 21b-24b. For example, if component 21 was a camera, data object 21b provided by component 21 to component 20 would provide a custom implementation of the data source interface that would be specialized to communicate with component 21 (i.e., the camera), using whichever protocols and/or data formats have been decided upon by the developer of component 21.

In this embodiment, components 20-24 include a set of universal interfaces 20a-24a, respectively. Components 20-24 may utilize the sets of universal interfaces 20a-24a to effect different types of communications, as will be described in further detail herein below. In particular, each set of universal interfaces 20a-24a comprises instructions, sets of operations and/or other data that can be understood and performed by each of the components 20-24 to enable them to communicate with each other. The one or more sets of universal interfaces 20a-24a enable components 20-24 to communicate for transferring data between each other (i.e., transmitting or receiving data), providing contextual information about themselves, providing access and information about collections of components (i.e., aggregations), providing event notifications or providing user interfaces for allowing users to access and/or manipulate components. In this particular embodiment, each set of universal interfaces 20a-24a comprises one or more of a data source interface, data sink interface, contextual interface, aggregation interface, mutable aggregation interface, notification interface or user interface, although other interfaces could be used. It should be appreciated that in this as well as other embodiments, each of the interfaces are universal as will be described in further detail herein. It also should be noted that in this embodiment, the set of universal interfaces 23a does not include any of the above-mentioned interfaces.

More particularly, in this embodiment, component 20 has stored in its memory, or otherwise has access to by accessing a server computer system or memory at another physical location as described above, which will hereinafter be referred to as being "associated with," a data source interface, a data sink interface, a contextual interface, an aggregation interface, a mutable aggregation interface, a notification interface and a user interface; component 21 is associated with a data sink interface, a contextual interface and a user interface; component 22 is associated with a data source interface, a data sink interface, a contextual interface, an aggregation interface, a mutable aggregation interface, a notification interface and a user interface; component 23 is not associated with any interfaces; and component 24 is associated with a contextual interface and a user interface.

It should be appreciated that in other embodiments, each of the components 20-24 may be associated with any number of interfaces in any combination, the particular number and/or combination depending upon the particular type of component, its capabilities and/or services desired by the component. Thus, for example, while component 20 has associated with it the set of universal interfaces 20a comprising the seven interfaces mentioned above, it may comprise a lesser or greater number of interfaces. Furthermore, component 20, and hence the set of universal interfaces 20a, can be updated at any time to add new interfaces, delete existing interfaces or modify any of the existing interfaces.

In another embodiment, the contextual interface comprises a getContext( ) operation that includes instructions and data that can be performed by a component for retrieving contextual data from another component. In this embodiment, the contextual data is stored at component 21 as a multi-valued data structure that resembles a hash table. However, the contextual data can be stored in any format depending upon the type of component, for example. Also in this particular embodiment, the contextual data includes information about component 21 such as what type of component it is, its operating status, identity, location, administrative domain, or any other type of environment data. In another embodiment, the contextual data may be stored at another physical location or component, for example.

In another embodiment, the user interface comprises a getUI( ), getState( ) and setState( ) operation that includes instructions and data that can be performed by component 20 for retrieving or generating a user window to provide users of component 20 with so they can access and/or manipulate components 21-22 or 24 to take advantage of additional functionality of the particular component. In this embodiment, the getUI( ) operation can be passed parameters when invoked by component 20 to indicate which type of user window the user would like generated, as described in further detail herein. The getUI( ) operation returns to component 20, from components 21-22 or 24, a user window and/or instructions for generating or retrieving a window interface, which may be instantiated by component 20 to display the user window to users, for example. The getState( ) operation includes instructions and data for requesting that a state token object be returned to component 20 from components 21-22 or 24. The state token object is an opaque object particular to whichever of components 21-22 or 24 it is returned from and encapsulates the current state (e.g., device settings or configuration) of the particular component. Further, the components 21-22 or 24 each may use different types of state token objects depending upon the particular type of component (e.g., a printer device or word processing application). Still further, components 21-22 or 24 each may encode their respective state token objects in various ways, such as pointers or URLs pointing to particular configurations. Alternatively, the state token objects may include a representation of the particular component's current state. Regardless of the methodology employed by components 21-22 or 24 to encode their respective state token objects, the state token object received and used by component 20 is opaque to component 20. The setState( ) operation includes instructions and data that may be performed by component 20 for generating a user interface 26 using the configuration data included in the state token object. Component 20 may pass the state token object as a parameter to the setState( ) operation when it is invoked, which can be used by components 21-22 or 24 to return instructions and data that can be performed by component 20 for retrieving or generating a user interface having the stored configuration included in the state token object. In another embodiment, the setState( ) operation is invoked by component 20 to reset the state of components 21-22 or 24 without having to recreate the user window for the user.

In this particular embodiment, the data source interface includes several operations such as a getSourceDataFlavor( ), a beginSourceTransfer( ) and a sendSourceTransfer( ) operation. Further, the data source interface includes instructions and data that can be performed by component 20 to establish a data transfer session to enable component 20 to request and receive data from component 21. The getSourceDataFlavor( ) operation includes instructions and data that may be performed by component 20 for determining which types of data component 21 can transmit. In this particular embodiment, component 20 performs the getSourceDataFlavor( ) operation which returns a list of one or more data types supported by component 21.

The beginSourceTransfer( ) operation includes instructions and data that may be performed by component 20 to request component 21 to establish a data transfer session so component 20 can receive data from component 21. The beginSourceTransfer( ) operation can be passed parameters in this embodiment when invoked such as a context parameter and an initial lease duration parameter. In this particular embodiment, data transfer sessions are leased and must be renewed periodically by component 20 at intervals of time corresponding to the value specified in the initial lease duration parameter passed to the beginSourceTransfer( ) operation when it is invoked to keep the data transfer session active. If component 20 fails to renew the lease, the data source interface includes instructions for ceasing the data transfer session and component 21 will no longer honor the attempt to transmit data because it will assume that component 20 has failed to renew the lease because it has either crashed or has otherwise become unreachable. In addition, component 20 passes a context parameter to the beginSourceTransfer( ) operation when invoking it to inform component 21 of its identity for a variety of reasons, such as for security purposes. Component 21 may decide whether to transmit data to component 20 based upon the identity information provided in the context parameter. In addition, if component 21 supports one or more types of data, as determined by performing the getSourceDataFlavor( ), a data flavor parameter may be passed to the beginSourceTransfer( ) operation for informing component 21 to transmit a preferred type of data supported by component 21. The beginSourceTransfer( ) operation returns a data source object to component 20 through data object 21b. The data source object includes the sendSourceTransfer( ) operation and the required instructions needed to enable component 20 to request and receive data from component 21, including protocols for video or file transfer, for example, depending on the type of data being received. Component 20 invokes the sendSourceTransfer( ) operation to actually retrieve the data from component 21.

In another embodiment, the data sink interface includes several operations such as a getSinkDataFlavor( ), beginSinkTransfer( ) and sendSinkTransfer( ) operation. Further, the data sink interface includes instructions and data that can be performed by component 20 for establishing a data transfer session to enable component 20 to transmit data to component 21. The getSinkDataFlavor( ) operation includes instructions and data that may be performed by component 20 for determining which types of data component 21 can receive and understand. In this particular embodiment, component 20 performs the getSinkDataFlavor( ) operation which returns a list of one or more data types supported by component 21.

The beginSinkTransfer( ) operation includes instructions and data that may be performed by component 20 to request component 21 to establish a data transfer session so component 20 can begin transmitting data to component 21. The beginSinkTransfer( ) operation can be passed parameters in this embodiment when invoked such as a context parameter and an initial lease duration parameter. In this particular embodiment, data transfer sessions are leased and must be renewed periodically by component 20 at intervals of time corresponding to the value specified in the initial lease duration parameter passed to the beginSinkTransfer( ) operation when it is invoked to keep the data transfer session active. If component 20 fails to renew the lease, the data source interface includes instructions for ceasing the data transfer session and component 21 will no longer honor the attempt to receive data because it will assume that component 20 has failed to renew the lease because it has either crashed or has otherwise become unreachable. In addition, component 20 passes a context parameter to the beginSinkTransfer( ) operation when invoking it to inform component 21 of its identity for a variety of reasons, such as for security purposes. Component 21 may decide whether to allow component 20 to transmit data to it based upon the identity information provided in the context parameter. The beginSinkTransfer( ) operation returns a data sink object to component 20 through data object 21b. The data sink object includes the sendSinkTransfer( ) operation and the required instructions needed to enable component 20 to transmit data to component 21, including protocols for video or file transfer, for example, depending on the type of data being transmitted. Component 20 invokes the sendSinkTransfer( ) operation to actually transmit the data to component 21. Component 20 may transmit the type of data understood or preferred by component 21 determined by performing the getSinkDataFlavor( ) operation.

In another embodiment, the aggregation interface includes instructions and data that may be performed by component 20 to access component 22, which includes an aggregation. An aggregation is a collection of other components. Further, aggregations may include collections of other aggregations. In this embodiment, the aggregation interface includes a number of operations such as an enumerate( ), validateHandle( ), enumerateHandles( ), get( ) and contains( ) operation, each of which may be passed one or more parameters as described further herein.

Component 20 performs the enumerate( ) operation and passes to it a context parameter to provide component 22 with the identity of component 20 for a number of reasons such as for security purposes or record keeping. The enumerate( ) operation causes component 22, assuming it agrees based upon the identity information provided in the context parameter, to return to component 20 an aggregate object that includes the components in the aggregate. Moreover, the components included in the aggregate object are either logically or physically located within component 22. Component 20 may perform the enumerate( ) operation to enumerate the actual components associated with component 22. Alternatively, component 20 may perform the enumerate( ) operation to enumerate the handles of the components associated with component 22. In this particular embodiment, a handle is an opaque token that maps to components included in an aggregation. Moreover, the handles may or may not correspond to real names that might be valid outside the aggregation. For example, in a file system aggregation, handles may be filenames. However, in a whiteboard image capture aggregation, for example, handles might be integers identifying how recent a capture took place. Further, different types of aggregations may use different, aggregation-specific, handle types. Still further, handles provide a way to use different keys for different sorts of aggregations, while keeping the client-side interface the same.

Component 22 may perform the validateHandle( ) operation, passing to it a handle parameter to determine whether a handle is the appropriate type for a particular aggregation. The aggregation interface also includes instructions that component 20 may perform for converting an arbitrary component to a handle so that, for example, where component 20 may convert string filenames included in an aggregate object associated with component 22 to handles. The enumerateHandles( ) operation is performed by component 20, passing to it a context parameter, and returns the handles associated with the aggregate of components associated with component 22. Component 20 performs the get( ) operation, passing to it a context parameter and a handle parameter, and returns the actual component associated with the handle parameter. The contains( ) operation is performed by component 20 and is passed a context parameter and a handle parameter to indicate whether the given handle parameter is a valid key in the aggregate. In this particular embodiment, the aggregate interface represents static maps in which the set of components included in the aggregation may not be changed by callers.

In another embodiment, the mutable aggregation interface includes an add( ), remove( ), rehandle( ) and a generateHandle( ) operation, each of which may be passed one or more parameters and performed by component 20 to modify one or more components in an aggregation associated with component 22, as described further herein. The add( ) and remove( ) operations are performed by component 20 to add or remove components from an aggregation associated with component 22. For the add( ) operation, a component parameter associated with the component being added is passed along with a context parameter of the invoking component, and the added component's handle within the aggregate is returned. For the remove( ) operation, a context parameter is passed along with the handle associated with the component being removed. The rehandle( ) operation is passed a context parameter along with an old handle parameter associated with a component that is desired to be renamed, and component 22 returns a new handle parameter to component 20 representing the new handle associated with the component. The generateHandle( ) operation may be passed a context parameter and/or an object parameter and is used by component 20 to create a new handle that is valid for the particular type of aggregation (e.g., file system) associated with component 22. In this embodiment, the object parameter is a mechanism for translating from notions that might be understood by users, such as filenames or image capture numbers, into the component-specific handles that are understood and used by aggregate components (i.e., component 22). If no object parameter is passed to the generateHandle( ) operation when it is invoked by component 20, then an arbitrary but unused handle is returned (e.g., the equivalent of a "temp" file in a file system). If an object parameter is passed to the generateHandle( ) operation when it is invoked, then a handle is returned that may be interpreted by component 20 in a way specific to the particular aggregate associated with component 22. For example, a file system aggregate may interpret such a parameter as a filename.

In another embodiment, the notification interface includes a register( ) operation, which may be passed one or more parameters and performed by component 20 to enable it to receive asynchronous notifications about events generated by components associated with a notification interface, which includes component 22 in this particular embodiment. Component 20 performs the register( ) operation, passing to it a context parameter, a component parameter and an initial lease duration parameter. The context parameter provides component 22 with the identity of component 20 for a number of reasons, such as enabling component 22 to decide whether it would desire sending notifications to component 20 for security purposes or record keeping. The component parameter represents one or more of components 21-24 desiring to be notified of events, which is component 20 in this embodiment. Further, event registrations are leased and must be renewed periodically by component 20 at intervals of time corresponding to the value specified in the initial lease duration parameter to keep the event registration active. If component 20 fails to renew the lease, the notification interface includes instructions for relieving component 22 of its obligation to provide component 20 with notifications about generated events because it will assume that component 20 has failed to renew the lease because it has either crashed or has otherwise become unreachable. In this embodiment, once component 20 has registered itself with component 22 by performing the register( ) operation, if a condition occurs in component 22 that should cause it to notify registered listeners (i.e., component 20) according to the instructions provided in the notification interface and associated operations, component 22 will send an event notification object to component 20. Component 20 may then generate a user window as described above to display the event information to a user. For example, if component 22 was a printer device and component 20 was a word processing application, component 22 would be able to provide component 20 with an event notification in the case where paper in the printer device jammed. Moreover, in this example, component 20 could display the event notification (i.e., paper jam) to the user using a GUI.

In another embodiment, each of the interfaces and associated operations therein comprise mobile code. Mobile code is executable data that can be transmitted to another system, or another component within a system, where the data is executed. For example, Java is an implementation of executable content (i.e., mobile code) that is widely used on the Internet. Users can download the mobile code from the Internet, for example, and locally run a program written in a truly common programming language. In this particular embodiment, each of the universal interfaces comprises mobile code that includes instructions that may be performed by components to communicate with each other. Moreover, variables or parameters, and data may be passed or provided to the universal interfaces that will be understood and utilized accordingly by the component associated with the universal interface, depending upon the particular type of communication. Still further, the universal interfaces may comprise sets of instructions or references to other universal interfaces, wherein the component could utilize the data or perform the instructions accordingly.

In another embodiment, the universal interfaces and associated operations therein each comprise object oriented mobile code, which is a programming methodology known to artisans having ordinary skill in the programming arts, where data types may be defined along with associated procedures or sets of instructions, the data types in this context often referred to as classes. Thus, a set of procedures or instructions may be associated with one or more data types. Moreover, the same name or identifier can be assigned to identify a procedure or a set of instructions that perform corresponding instructions depending on the particular data types associated therewith, often referred to as polymorphism. Thus, for exemplary purposes only, a draw procedure could be performed to draw circles or rectangles depending upon the type of data provided, or passed, to the procedure when it is invoked. Further in this example, if a circle data type defines a radius coordinate, for example, and a draw procedure is invoked and the circle data type is passed to the draw procedure, the draw procedure, inheriting any other data types associated with the draw procedure, can use the data provided thereto to perform the appropriate procedure or sets of instructions to draw a circle. Thus, in this particular embodiment of the present invention, when interfaces are provided to a particular component, procedures, sets of instructions and other data associated with the particular interface become available to the particular component to access and perform as will be described further herein below in accordance with one or more embodiments of the present invention.

Referring more specifically to FIG. 1, the operation of one or more embodiments of the present invention of communication system 10 will now be described.

In one embodiment of the present invention, component 20 discovers component 21, component 22, component 23 and component 24 using a variety of discovery systems such as the Bluetooth™ Service Location Protocol ("SLP") developed by Bluetooth SIG, inc., the Universal Description, Discovery, and Integration Protocol ("UDDI"), developed by the Ariba, IBM and Microsoft Corps., the various Jini™ system discovery protocols or simple lookup in a name server, for example, all of which are hereby incorporated by reference in their entirety. Discovered components 21-24 each return data object 21-24*b*, respectively, to component 20. Component 20 may introspect the received data objects 21*b*-24*b* to determine which one or more interfaces are associated with components 21-24. Thus, for example, upon component 20 performing the above-described discovery and receiving data object 21*b* from component 21, component 20 may introspect the received data object 21*b* to determine that component 21 is associated with a data sink interface, a contextual interface and a user interface.

Figure 2:
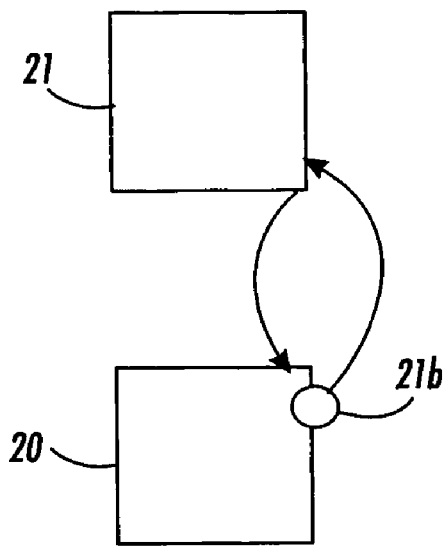
FIG. 2 is a block diagram of a system providing contextual data to a component in accordance with another embodiment.
Figure 3:
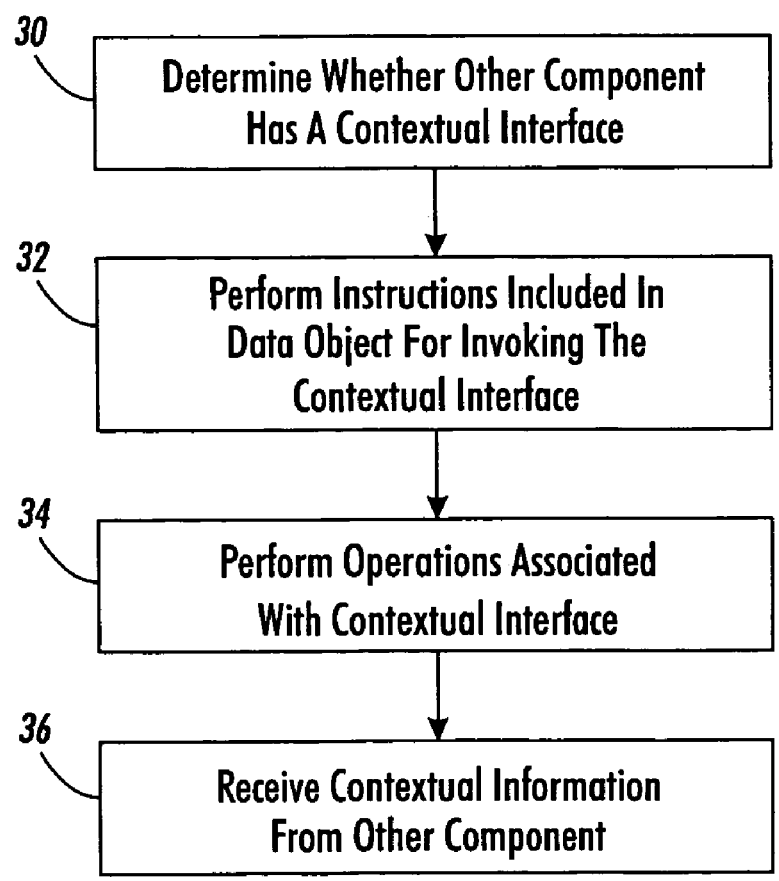
FIG. 3 is a flow chart of a process for providing contextual data to a component in accordance with another embodiment.

Referring generally to FIGS. 2-3, the operation of one embodiment of the present invention of communication system 10 will be described.

Referring to FIG. 2, data object 21*b* includes a reference to a context interface associated with component 21. Thus, in this particular embodiment, component 20 performs the instructions included in the context interface that instructs component 20 to obtain contextual information from component 21. Further, the operations associated with the contextual interface can be performed by component 20 at any time to access and retrieve contextual information from component 21.

Referring to FIG. 3, at step 30 component 20 performs the discovery process and determines that component 21 is associated with a contextual interface by introspecting data object 21*b* as described above. Component 20 performs the instructions included in data object 21*b* for invoking the contextual interface at step 32. At step 34, component 20 performs the instructions included in the contextual interface for retrieving the contextual data. In particular, component 20 invokes the get context( ) operation and performs the instructions associated with the get context( ) operation to receive the contextual data from component 21 through the get context( ) operation at step 36.

Figure 4:
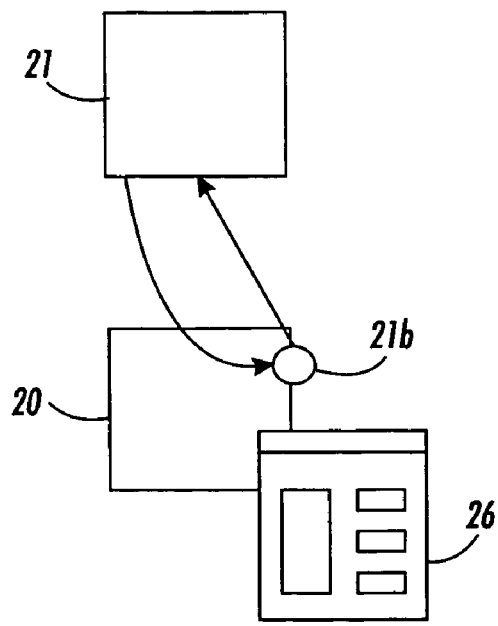
FIG. 4 is a block diagram of a system for providing a user interface to a component in accordance with another embodiment.
Figure 5:
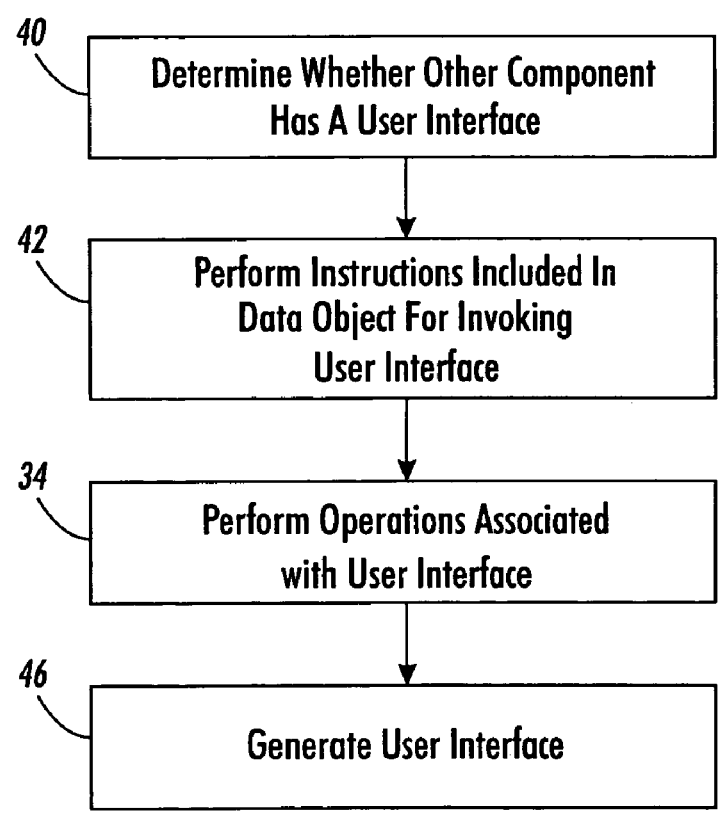
FIG. 5 is a flow chart of a process for providing a user interface to a component in accordance with another embodiment.

Referring generally to FIGS. 4-5, the operation of another embodiment of the present invention of communication system 10 will be described.

Referring to FIG. 4, data object 21*b* includes a reference to the user interface associated with component 21 to enable component 20 to generate and/or display component window 26 (i.e., the user window mentioned above). Thus, in this particular embodiment, component 20 performs the instructions included in the user interface that instructs component 20 to generate and/or display the component window 26. Further, the operations associated with the user interface can be performed by component 20 at any time to generate the component window 26 for accessing and/or manipulating component 21.

Referring to FIG. 5, at step 40, component 20 performs the discovery process and determines that component 21 is associated with a user interface by introspecting data object 21b as described above. At step 42, component 20 performs the instructions included in data object 21b for invoking the user interface. At step 44, component 20 performs the operations included in the user interface for generating the component window 26. In particular, component 20 invokes the getUI( ) operation included in the user interface.

Component 20 performs the instructions associated with the getUI( ) operation to generate component window 26 for a user at component 20 at step 46.

In another embodiment, when component 20 invokes the getUI( ) operation it may specify that it desires the component window 26 to be displayed in a graphical user window, such as a graphical user interface ("GUI"). Alternatively, component window 26 may comprise an audio user window that utilizes speech, for example. In this embodiment, component 21 provides component 20 with the desired type of component window 26 when the user interface is invoked by component 20. In this particular embodiment, users at component 20 could view the component window 26 associated with component 21 through a display device associated with component 20. Moreover, the users may utilize a user input device to manipulate the settings of component 21 (e.g., printer control settings such as half duplex or full duplex) through the component window 26. The component window 26 provides a user at component 20 with access to additional functionality of component 21, or any of components 22 or 24, that otherwise might not be accessible using any of the other interfaces described above. It should be appreciated that in this particular embodiment where component window 26 comprises a GUI, component 20 invoking the user interface to access and manipulate component 21 would have access to a display device for displaying the component window 26. Moreover, where component window 26 comprises an audio user window that utilizes speech, such as in the case where component 20 comprises a mobile telephone, for example, component 20 has a speaker for audio output and a keypad or microphone for accepting user input. Further, users at component 20 may also use a number of other devices for accepting user input such as a mouse or keyboard as well as other input and output modalities.

Figure 6:
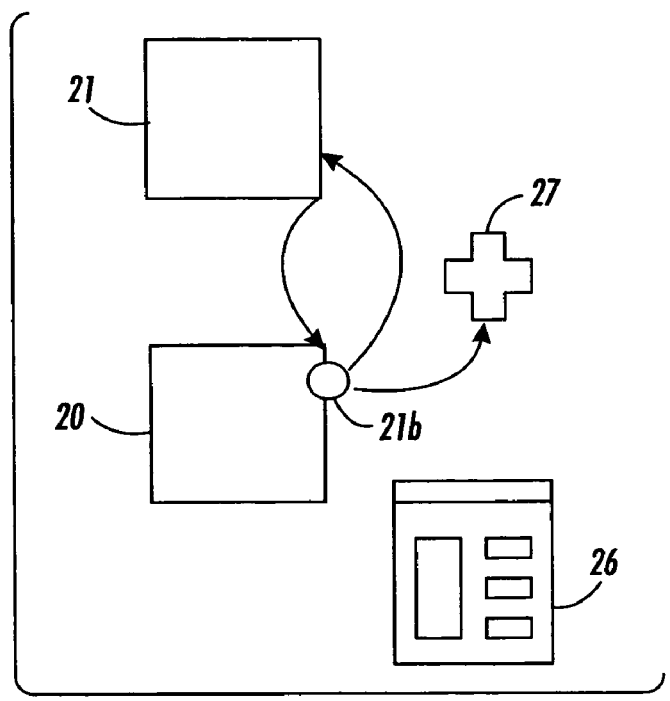
FIG. 6 is a block diagram of a system for storing a configuration of a user interface for a component in accordance with another embodiment.
Figure 7:
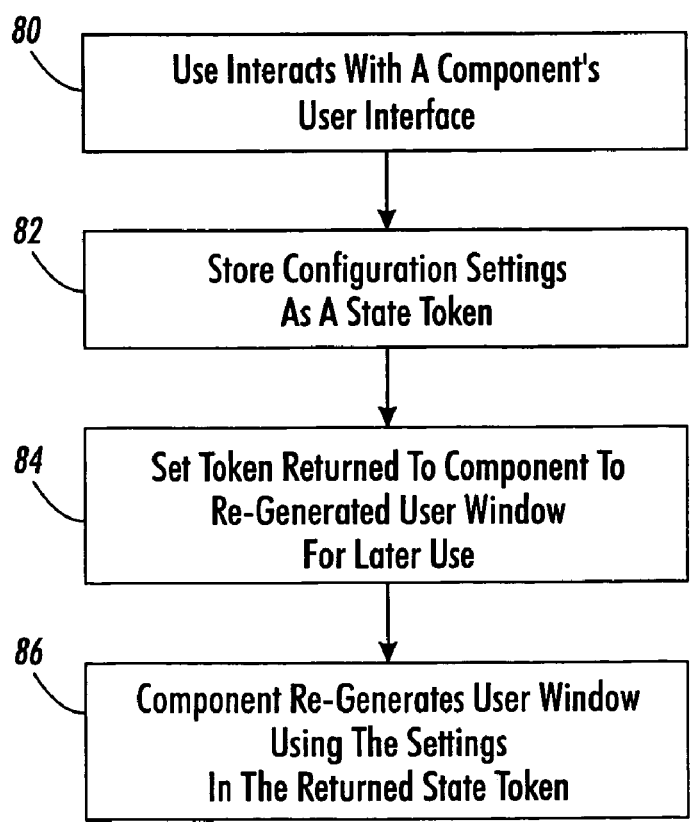
FIG. 7 is a flow chart of a process for storing a configuration of a user interface for a component in accordance with another embodiment.

Referring generally to FIGS. 6-7, the operation of another embodiment of the present invention of communication system 10 will now be described.

Referring to FIG. 6, a user may save a configuration of component 21 that was created through interaction with component window 26, as described in connection with FIGS. 4 and 5. The user may subsequently recreate the particular configuration without having to reconfigure the settings for component 21 through component window 26. In this embodiment, component 20 may perform the getstate( ) operation included in the user interface to communicate with component 21 to receive state token 27, which may be stored in a memory of component 20. Component 20 can recreate the above-described configuration of component 21 by performing the setState( ) operation included in the user interface and passing the state token 27 in to the setState( ) operation when it is invoked.

Referring to FIG. 7, at step 80, a user at component 20 interacts with component window 26 to manipulate one or more settings in component 21, for example. At step 82, where component window 26 comprises a GUI, the user is prompted by a dialogue box displayed on a display device associated with component 20 to inquire as to whether the user would like to save the current settings of component 21 as represented by component window 26. If the user decides to save the current settings, he may indicate so using a variety of methods, such as using a conventional user input device (e.g., mouse or keyboard), and component 20 performs the getState( ) operation, which includes instructions for requesting that state token 27 be generated by component 21. At step 84, component 21 returns the generated state token 27 to component 20, which is stored at component 20. When users at component 20 desire recalling the settings of component 21 stored in state token 27, component 20 performs the setState( ) operation, passing to it the stored state token 27, to regenerate the stored configuration of component 21.

Figure 8:
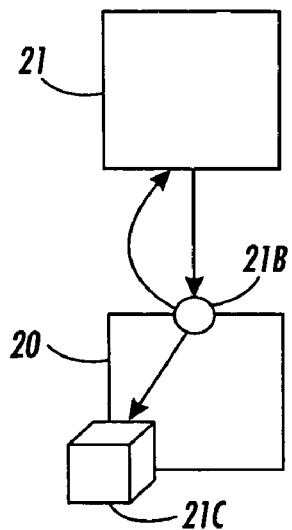
FIG. 8 is a block diagram of a system for transferring data from one component to another in accordance with another embodiment.
Figure 9:
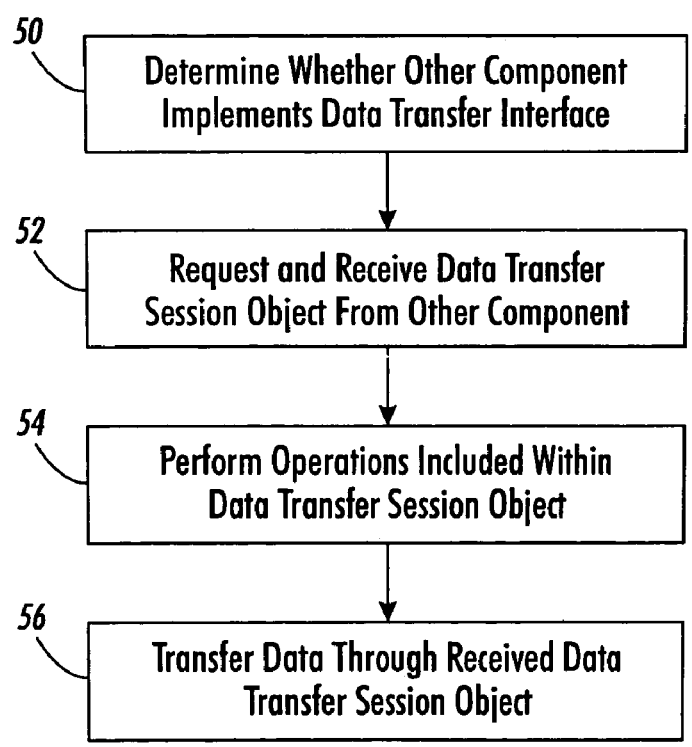
FIG. 9 is a flow chart of a process for transferring data from one component to another in accordance with another embodiment.

Referring generally to FIGS. 8-9, the operation of another embodiment of the present invention of communication system 10 will now be described.

Referring to FIG. 8, component 20 and component 21 can transfer data between each other. In this particular embodiment, component 21 may serve as a source of data and component 20 may serve as the recipient of data from component 21. Thus, component 20 may invoke the data source interface associated with component 21 and included in data object 21b. In particular, component 20 performs the beginSourceTransfer( ) operation included in the data source interface to request and receive a data source object 21c from component 21 to accomplish the data transfer between the two components.

Referring to FIG. 9, at step 50, component 20 performs the discovery process and determines by introspecting data object 21b, as described above, that components 20 and 21 can transfer data between each other because component 20 is associated with a data sink interface and component 21 is associated with a data source interface. Component 20 invokes the data source interface associated with component 21 that includes instructions that instruct component 20 to perform the getSourceDataFlavors( ) operation included in data object 21b. The getSourceDataFlavors( ) operation in turn includes instructions for accessing component 21 to provide component 20 with the types of data supported by component 21. For example, after performing the above-mentioned operations, component 20 may determine that component 21 supports data in a "JPEG" format. At step 52, component 20 performs the beginsourceTransfer( ) operation included in the data source interface. In addition, the beginsourceTransfer( ) operation may be passed parameters in this embodiment when invoked such as the context parameter and the initial lease duration parameter described above. Component 21 returns the data source object 21c to component 20. At step 54, component 20 may receive data from component 21 by way of the data source object 21c. In particular, data source object 21c includes the sendSourceTransfer( ) operation and the instructions described above that may be performed by component 20 to retrieve data from component 21.

In another embodiment (not illustrated), component 20 may serve as a source of data and component 21 may serve as the recipient of data from component 20. Thus, component 20 may invoke the data sink interface associated with component 21 and included in data object 21b. In particular, component 20 performs the beginSinkTransfer( ) operation included in the data sink interface to request and receive a data sink object from component 21 to accomplish the data transfer between the two components.

In this particular embodiment, the steps for enabling component 20 to transmit data to component 21 are the same as for enabling component 20 to request and receive data from component 21, as described in steps 50-56 (FIG. 9), except that the above described data source interface and getSinkDataFlavor( ), beginSinkTransfer( ) and sendSinkTransfer( ) operations are utilized instead of the getSourceDataFlavor( ), beginSourceTransfer( ) and sendSourceTransfer( ) operations to enable component 20 to transmit data to component 21.

Figure 10:
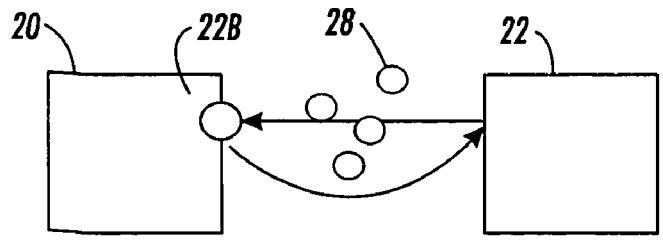
FIG. 10 is a block diagram of a system for communicating with an aggregate of components in accordance with another embodiment.
Figure 11:
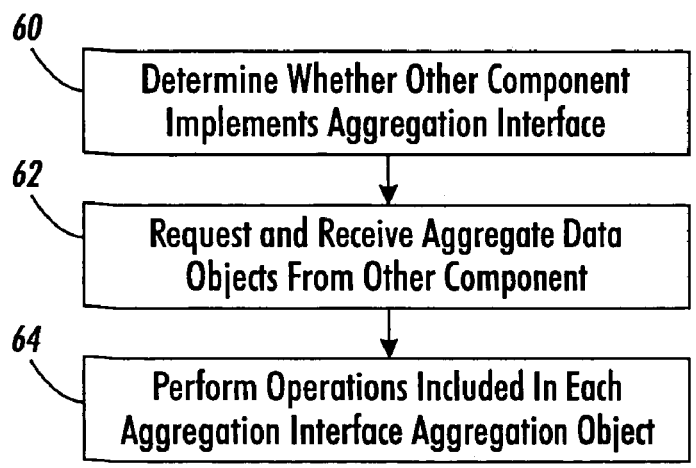
FIG. 11 is a flow chart of a process for communicating with an aggregate of components in accordance with another embodiment.
Figure 12:
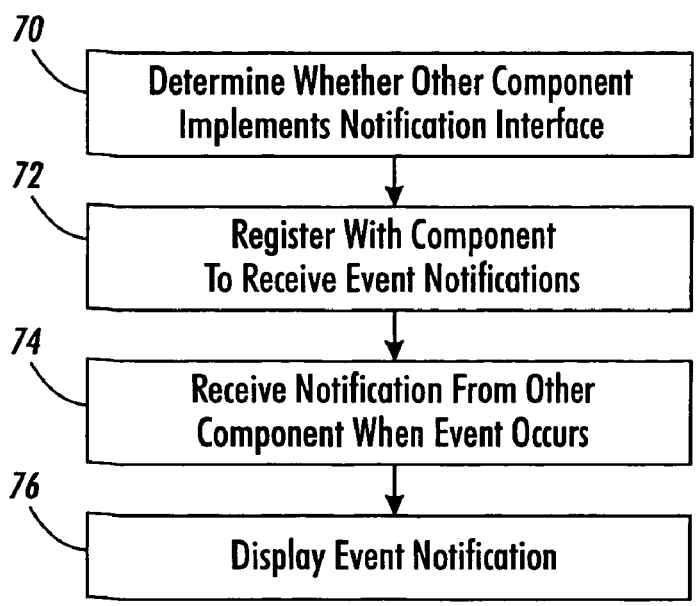
FIG. 12 is a flow chart of a process for providing event notifications to components in accordance with another embodiment.

Referring generally to FIGS. 10-12, the operation of another embodiment of the present invention of communication system 10 will be described.

Referring to FIG. 10, data object 22b includes a reference to the aggregate interface associated with component 22 to enable component 20 to access an aggregation associated with component 22. Component 20 invokes the aggregate interface to receive aggregate data objects 28. In this embodiment, the aggregate data objects 28 may include data objects 21b, 23b or 24b. Further, component 20 can perform instructions included in aggregate data object 28 that enable it to communicate with each of the components and/or aggregations (i.e., data objects 21b, 23b or 24b) included in aggregate data object 28.

Referring to FIG. 11, at step 60, component 20 performs the discovery process and determines that component 22 is associated with an aggregation interface by introspecting data object 22b as described above. At step 62, component 20 invokes the aggregation interface associated with component 22 that includes instructions that instruct component 20 to request that component 22 provide it with aggregate data object 28. Component 22 returns to component 20 aggregate data object 28 including data objects 21b, 23b or 24b. At step 64, component 20 performs one or more of the above-described enumerate( ), validateHandle( ), enumerateHandles( ), get( ) or contains( ) operations included in the aggregation interface.

In another embodiment, component 20 performs the discovery process and determines that component 22 is associated with a mutable aggregation interface by introspecting data object 22b as described above. This embodiment includes the same steps as steps 60-64 (FIG. 11) described above, except that component 20 invokes the mutable aggregation interface associated with component 22 and performs one or more of the above-described add( ), remove( ), rehandle( ) and generateHandle( ) operations instead of one or more of the above-described enumerate( ), validateHandle( ), enumerateHandles( ), get( ) or contains( ) operations included in the aggregation interface.

Referring to FIG. 12, at step 70, component 20 performs the discovery process and determines that component 22 is associated with a notification interface by introspecting data object 22b as described above. At step 72, component 20 invokes the notification interface associated with component 22 that includes instructions that instruct component 20 to request that component 22 provide it with event notifications by performing the register( ) operation. Component 22 returns to component 20 an event notification object when a condition occurs in component 22 that should cause it to notify component 20 at step 74. At step 76, component 20 may use the event notification object to generate a user window as described above to display the event information to a user.

It should be appreciated that one or more of the various methods of the present invention as described above may be stored in computer-readable media to be distributed to users so that they may download the methods from the media into a memory to be executed by a processor, the memory and processor associated with a new component, for enabling the new component to communicate with the components in communications system 10. In addition or alternatively, one or more of the various methods of the present invention may be transmitted to the new component over a line-based or wireless network environment in a computer data signal embodied in a carrier wave and downloaded into a memory to be executed by a processor, the memory and processor associated with the new component, for enabling the new component to communicate with the components in communications system 10. For example, a user may visit an Internet Web site to purchase and download an application package that includes one or more of the various methods of the present invention into the user's new component, which may include a computer, PDA device or cellular telephone. The user could then configure the new component using the downloaded application package to enable the new component to communicate with the components in communications system 10.

Other modifications of the present invention may occur to those skilled in the art subsequent to a review of the present application, and these modifications, including equivalents thereof, are intended to be included within the scope of the present invention.

What is claimed is:

1. A system for enabling one or more arbitrary components to communicate with each other, the system comprising:
   a first component associated with one or more universal interfaces, wherein the one or more universal interfaces comprise executable code and data;
   a second component obtaining one of the one or more universal interfaces associated with the first component, wherein the second component includes a discovery mechanism configured to discover the first component;
   wherein the second component automatically invokes at least one of the universal interfaces to communicate with the first component; and
   wherein the second component and the first component do not share a standard communication protocol which is distinct from a discovery protocol that is part of the discovery mechanism.

2. The system as set forth in claim 1 wherein the first component transfers a data object to the second component, the data object having the one or more universal interfaces.

3. The system as set forth in claim 1 wherein the first component transfers a data object to the second component, the data object having instructions and data for accessing the one or more universal interfaces.

4. The system as set forth in claim 1 wherein the second component has instructions and data for accessing a data object, the data object having the one or more universal interfaces.

5. The system as set forth in claim 1 wherein the second component interacts with an operating system environment, the operating system environment having instructions and data for accessing a data object having the one or more universal interfaces.

6. The system as set forth in claim 1 wherein the second component has instructions and data for using the one or more universal interfaces.

7. The system as set forth in claim 1 wherein a third component transfers a data object to the second component, the data object having the one or more universal interfaces associated with the first component.

8. The system as set forth in claim 1 wherein the one or more universal interfaces comprise a data source interface, a data sink interface, an aggregation interface, a mutable aggregation interface, a context interface, a notification interface or a user interface.

9. The system as set forth in claim 1 wherein the one or more universal interfaces comprise object-oriented mobile code having instructions for obtaining, interpreting, viewing or modifying data associated with one or more collections of components, providing one or more user interfaces to allow one or more components to be accessed or manipulated, allowing one or more components to provide event notifications or retrieving contextual data associated with the second component.

10. The system as set forth in claim 1 wherein one of the one or more universal interfaces comprise a source-specific data transfer session having instructions for converting data transferred through the source-specific data transfer session.

11. The system as set forth in claim 1 wherein the one or more arbitrary components comprise a computer system, device, network service, application, data, memory, file directory or individual file.

12. A method for enabling one or more arbitrary components to communicate with each other, the method comprising:
performing a discovery operation at a second component to discover a first component;
obtaining one of one or more universal interfaces associated with the first component at the second component, wherein the one or more universal interfaces comprise executable code and data;
automatically invoking at least one of the universal interfaces at the second component to communicate with the first component; and
wherein the second component and the first component do not share a standard communication protocol which is distinct from a discovery protocol that is part of the discovery operation.

13. The method as set forth in claim 12 further comprising transferring a data object to a second component, the data object having the one or more universal interfaces.

14. The method as set forth in claim 12 further comprising transferring a data object to a second component, the data object having instructions and data for enabling the second component to use the one or more universal interfaces.

15. The method as set forth in claim 12 further comprising transferring a data object to a second component, the second component having instructions and data for enabling it to use the one or more universal interfaces.

16. The method as set forth in claim 12 wherein a second component interacts with an operating system environment, the operating system environment having instructions and data for enabling the second component to use the one or more universal interfaces.

17. The method as set forth in claim 12 wherein a second component performs instructions for using the one or more universal interfaces.

18. The method as set forth in claim 12 wherein a third component transfers a data object to a second component, the data object having the one or more universal interfaces associated with the first component.

19. The method as set forth in claim 12 wherein the one or more universal interfaces comprise a data source interface, a data sink interface, an aggregation interface, a mutable aggregation interface, a context interface, a notification interface or a user interface.

20. The method as set forth in claim 12 wherein the one or more universal interfaces comprise object-oriented mobile code having instructions for obtaining, interpreting, viewing or modifying obtaining, viewing or modifying data associated with a collection of components, providing an interface to allow requested components to be accessed or manipulated directly, allowing requested components to provide the one or more other components with status updates of the requested components or retrieving contextual data associated with the second component.

21. The method as set forth in claim 12 wherein one of the one or more universal interfaces comprise a source-specific data transfer session having instructions for converting data transferred through the source-specific data transfer session.

22. The method as set forth in claim 12 wherein the one or more arbitrary components comprise a device, network service, application, data, memory, file directory or individual file.

23. A computer readable medium having stored thereon instructions for enabling one or more arbitrary components to communicate with each other, which when executed by one or more processors, causes the processors to perform the steps of:
discovering a first component at a second component;
obtaining one of one or more universal interfaces associated with the first component at the second component, wherein the one or more universal interfaces comprise executable code and data;
automatically invoking at least one of the universal interfaces at the second component to communicate with the first component; and
wherein the second component and the first component do not share a standard communication protocol which is distinct from a discovery protocol that is part of the discovering step.

24. The medium as set forth in claim 23 further comprising transferring a data object to a second component, the data object having the one or more universal interfaces.

25. The medium as set forth in claim 23 further comprising transferring a data object to a second component, the data object having instructions and data for enabling the second component to use the one or more universal interfaces.

26. The medium as set forth in claim 23 further comprising transferring a data object to a second component, the second component having instructions and data for enabling it to use the one or more universal interfaces.

27. The medium as set forth in claim 23 wherein a second component interacts with an operating system environment, the operating system environment having instructions and data for enabling the second component to use the one or more universal interfaces.

28. The medium as set forth in claim 23 wherein a second component performs instructions for using the one or more universal interfaces.

29. The medium as set forth in claim 23 wherein a third component transfers a data object to a second component, the data object having the one or more universal interfaces associated with the first component.

30. The medium as set forth in claim 23 wherein the one or more universal interfaces comprise a data source interface, a data sink interface, an aggregation interface, a mutable aggregation interface, a context interface, a notification interface or a user interface.

31. The medium as set forth in claim 23 wherein the one or more universal interfaces comprise object-oriented mobile code having instructions for obtaining, interpreting, viewing or modifying obtaining, viewing or modifying data associated with a collection of components, providing an interface to allow requested components to be accessed or manipulated directly, allowing requested components to provide the one or more other components with status updates of the requested components or retrieving contextual data associated with the second component.

32. The medium as set forth in claim 23 wherein one of the one or more universal interfaces comprise a source-specific data transfer session having instructions for converting data transferred through the source-specific data transfer session.

33. The medium as set forth in claim 23 wherein the one or more arbitrary components comprise a device, network service, application, data, memory, file directory or individual file.

* * * * *

UNITED STATES PATENT AND TRADEMARK OFFICE
CERTIFICATE OF CORRECTION

| | | |
|---|---|---|
| PATENT NO. | : 7,296,042 B2 | |
| APPLICATION NO. | : 09/838933 | |
| DATED | : November 13, 2007 | |
| INVENTOR(S) | : Warren Keith Edwards | |

It is certified that error appears in the above-identified patent and that said Letters Patent is hereby corrected as shown below:

On The Title Page, Item (73), Assignee

Please delete "Palo Alto Research Center Incorporated, Palo Alto, CA (US)" and insert --Xerox Corporation, Stamford, CT (US)--

Signed and Sealed this

Twenty Second Day of April, 2008

JON W. DUDAS
*Director of the United States Patent and Trademark Office*